Dec. 28, 1926.

G. W. NIGG 1,612,307

ARC WELDING REACTOR

Filed Nov. 9, 1922

INVENTOR:
GILBERT W. NIGG,
BY
Graham + Lewis
ATTORNEYS.

Patented Dec. 28, 1926.

1,612,307

UNITED STATES PATENT OFFICE.

GILBERT W. NIGG, OF COVINA, CALIFORNIA.

ARC-WELDING REACTOR.

Application filed November 9, 1922. Serial No. 599,809.

My invention relates to the art of arc welding. In this art an electric current of high amperage and low voltage is caused to pass between an electrode and a surface to be welded, this arc melting a portion of the electrode or melting foreign matter introduced into the arc, which melted matter adheres to the surface or surfaces to be welded, which surfaces are themselves partly melted by the arc.

In ordinary practice, arc welding is used very largely for welding iron or metal parts together or to other metals, the welding being accomplished by the introduction of iron, steel or iron alloys into the arc which metal becomes fused, adhering to the surfaces which it is desired to weld, and tying them together.

It is common practice in arc welding to employ a motor generator set, the motor end of which is connected to the source of power and the generator end of which is utilized to produce the arc. Such motor generator sets are quite economical and efficient but they are extremely bulky and rather expensive.

It is a purpose of my invention to provide means by which an ordinary alternating electric current source of supply may be directly utilized for welding purposes, without the use of rotating machines.

A further object of the invention is to provide a novel form of reactor for use in this connection.

Further objects and advantages will be made evident hereinafter.

Referring to the drawing which is for illustrative purposes only,

Figure 1:
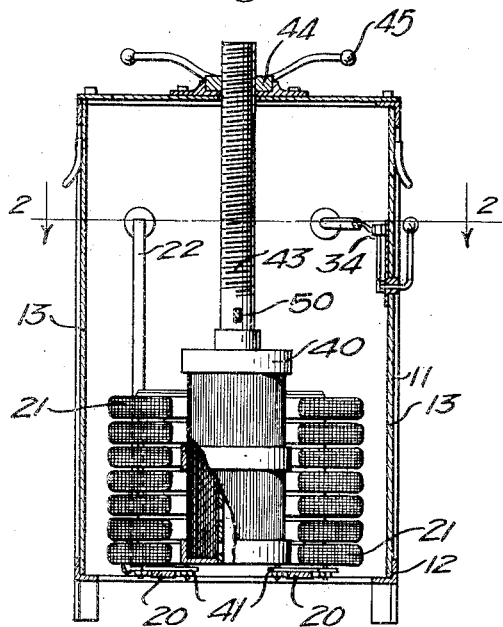
Fig. 1 is an elevation partly in section through one embodiment of my invention.
Figure 3:
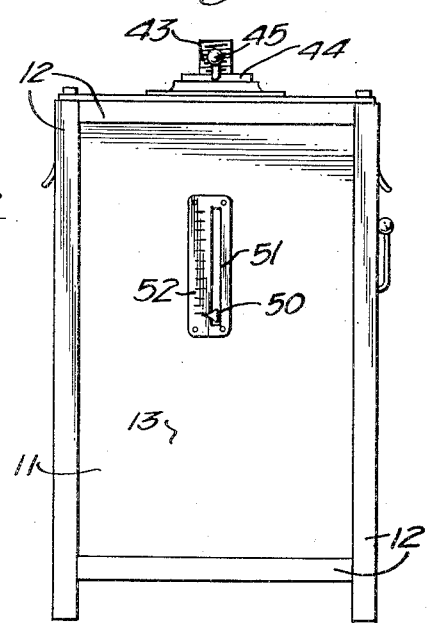
Fig. 3 is a side elevation showing the indicator.
Figure 2:
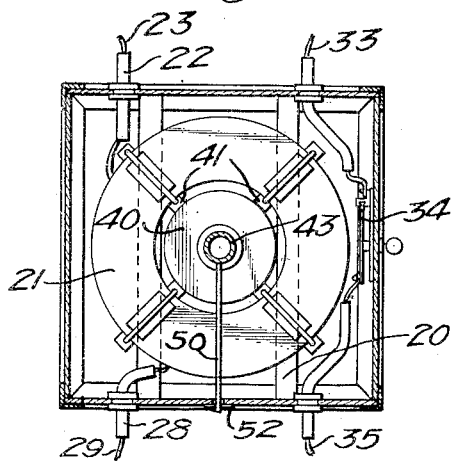
Fig. 2 is a section on a plane represented by the line 2—2 of Fig. 1.
Figure 4:
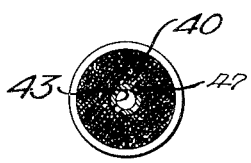
Fig. 4 is a section through the core.
Figure 5:
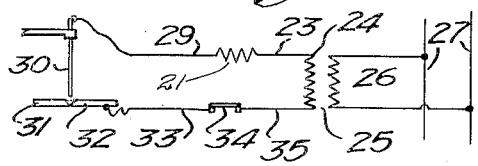
Fig. 5 is a diagram of connections.

In the form of the invention shown I provide a housing 11 which is preferably built up of an angle iron frame 12 having panels of fiber 13 set therein. Secured on cross members 20 is a reactance coil 21, this coil being formed of copper straps wound flat upon themselves to form a plurality of annular shaped coils which are connected in series, being spaced apart from each other for purposes of ventilation, and being secured by U-bolts and plates 41. One terminal of this reactance coil 21 is brought out through an insulating bushing 22 as shown at 23, being connected to one side of a secondary 24 of a transformer 25 having a primary 26 which is connected directly to the alternating current supply mains 27. The other side of the coil 21 is brought out through an insulating bushing 28 as shown at 29 and may be connected to an electrode 30. The surfaces to be welded 31 and 32 are then connected by a wire 33 with a switch 34 placed inside the housing 11, the other side of the switch 34 being connected through a wire 35 with one side of the secondary 24.

A hollow core 40 is suspended centrally inside the coil 21. The core 40 is suspended upon a screw 43 which may be formed of a pipe if desired, this screw extending through the top of the housing 11 and being provided with a nut 44 having handles 45 on either side thereof. By turning the nut 44 on the screw 43 the core 40 may be raised and lowered. The hollow screw 43 communicates with the hollow portion of the core and provides a stack through which heated air rises, thus providing an efficient ventilation.

For the purpose of indicating to the operator the exact position of the core I provide a pointer 50, this pointer extending through a slot 51 in the side of the box and being adjacent to a calibrated plate 52 on the outside of the box. By means of the pointer 50, it is possible for the operator to determine at all times the exact position of the core. With the core in the position shown in Fig. 1, that is to say, with the core entirely within the coil, a minimum quantity of current will flow to the arc, the amount of this current being governed entirely by the voltage supplied by the secondary 24 and the electrical dimensions of the reactor.

If it is desired to increase this current, the nut 44 is turned by means of the handles 45 to raise the core 40 out of the coil and thus decrease the induction and increase the current flowing, other conditions remaining as before. It is obvious that by the use of this apparatus the operator can readily regulate the current within certain practical limits to suit the character of the weld which he desires to make and due to the indicator 50, the operator can at all times see the exact position of the core.

I claim as my invention:

1. A reactor for use in arc welding comprising: a reactance coil; a housing enclosing said reactance coil; a hollow core movably disposed inside said reactance coil; a hollow screw secured to said core, said screw projecting vertically upward from said core through said housing, the interior of said screw communicating with the interior of said core; and means for raising and lowering said screw so as to adjust the position of said core relative to said coil.

2. A reactor, of the class described, comprising: a coil; a vertical hollow screw extending through said coil; a core mounted at the lower end of said screw, said lower end of said screw having openings therein through which heated air may pass from said core, said hollow screw providing a draft flue for said heated air; and means for raising and lowering said screw so as to adjust the position of said core within said coil.

In testimony whereof, I have hereunto set my hand at Los Angeles, California, this 1st day of November, 1922.

GILBERT W. NIGG.